US012345800B2

(12) United States Patent
Burger et al.

(10) Patent No.: US 12,345,800 B2
(45) Date of Patent: Jul. 1, 2025

(54) METHOD AND DEVICE FOR DETERMINING A TARGET POSITION OF A SURROUNDINGS SENSOR OF A VEHICLE

(71) Applicant: Vitesco Technologies GmbH, Regensburg (DE)

(72) Inventors: Katharina Burger, Munich (DE); Willibald Reitmeier, Munich (DE); Friedbert Stuhlfelner, Munich (DE); Philipp Seifert, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 664 days.

(21) Appl. No.: 17/762,959

(22) PCT Filed: Sep. 21, 2020

(86) PCT No.: PCT/EP2020/076214
§ 371 (c)(1),
(2) Date: Mar. 23, 2022

(87) PCT Pub. No.: WO2021/058409
PCT Pub. Date: Apr. 1, 2021

(65) Prior Publication Data
US 2022/0342066 A1 Oct. 27, 2022

(30) Foreign Application Priority Data
Sep. 24, 2019 (DE) .................. 10 2019 214 544.2

(51) Int. Cl.
*G01S 13/58* (2006.01)
*B60R 1/074* (2006.01)
(Continued)

(52) U.S. Cl.
CPC .............. *G01S 13/58* (2013.01); *B60R 1/074* (2013.01); *B60R 11/00* (2013.01); *G01S 13/931* (2013.01);
(Continued)

(58) Field of Classification Search
CPC ....... G01S 13/58; G01S 13/931; B60R 1/074; B60R 11/00; B60R 2011/004; B60R 2011/0092
(Continued)

(56) References Cited

U.S. PATENT DOCUMENTS

| 7,729,856 B2 * | 6/2010 | Danz ..................... G01S 15/101 |
| | | 340/904 |
| 8,775,064 B2 * | 7/2014 | Zeng ..................... G01S 13/931 |
| | | 701/1 |

(Continued)

FOREIGN PATENT DOCUMENTS

| CN | 101040298 A | 9/2007 | ............... G06T 7/00 |
| CN | 103946897 A | 7/2014 | ............... G07C 5/00 |

(Continued)

OTHER PUBLICATIONS

Search Report for International Application No. PCT/EP2020/076214, 13 pages.

(Continued)

*Primary Examiner* — Nuzhat Pervin
(74) *Attorney, Agent, or Firm* — Slayden Grubert Beard PLLC

(57) ABSTRACT

Various embodiments of the teachings herein include a method for determining a target position of a surroundings sensor of a vehicle using a vehicle-side attachment element as a calibration object, wherein the sensor and the attachment element are movable relative to each other. The method includes: ascertaining a first position of the sur- (Continued)

roundings sensor in a first relative pose; moving the sensor and/or the element from the first pose to a second pose between the sensor and the element; ascertaining a second actual position of the surroundings sensor in the second relative pose; and determining the target position of the surroundings sensor by averaging the first position and the second position to form an averaged actual position and assigning the averaged actual position as the target position.

15 Claims, 7 Drawing Sheets

(51) Int. Cl.
*B60R 11/00* (2006.01)
*G01S 13/931* (2020.01)

(52) U.S. Cl.
CPC . *B60R 2011/004* (2013.01); *B60R 2011/0092* (2013.01)

(58) Field of Classification Search
USPC .......................................................... 342/25
See application file for complete search history.

(56) References Cited

U.S. PATENT DOCUMENTS

| | | | | |
|---|---|---|---|---|
| 8,930,063 B2* | 1/2015 | Gandhi | ............... | G01S 13/726 |
| | | | | 342/174 |
| 9,199,378 B2* | 12/2015 | Groll | ..................... | B25J 9/1692 |
| 9,378,642 B2* | 6/2016 | Shida | ................ | B60K 31/0008 |
| 9,637,053 B2* | 5/2017 | Schofield | ................ | B60R 1/29 |
| 9,668,146 B2* | 5/2017 | Lau | ...................... | G05D 1/0274 |
| 10,088,553 B2* | 10/2018 | Zeng | ...................... | G01S 13/87 |
| 10,502,812 B2* | 12/2019 | Fujii | ..................... | G01S 7/4026 |
| 10,746,848 B2* | 8/2020 | Katayama | ............... | G01S 13/93 |
| 11,163,041 B2* | 11/2021 | Hasberg | ................ | G01S 13/931 |
| 11,307,300 B2* | 4/2022 | Klotzbuecher | ......... | G01S 13/42 |
| 11,405,097 B2* | 8/2022 | Cross | ...................... | H04B 7/1851 |
| 11,454,525 B2* | 9/2022 | Schwindt | ................. | G01S 7/40 |
| 11,493,624 B2* | 11/2022 | Passmann | ............... | G01S 13/931 |
| 11,586,931 B2* | 2/2023 | Refaat | .................. | G05D 1/0221 |
| 11,846,722 B2* | 12/2023 | Breddermann | ......... | G01S 13/89 |
| 11,906,655 B2* | 2/2024 | Vossiek | ................ | G01S 13/003 |
| 12,136,160 B2* | 11/2024 | Bahulkar | ............... | G06T 19/006 |
| 2002/0072869 A1* | 6/2002 | Stiller | .................. | G01S 17/931 |
| | | | | 702/90 |
| 2004/0027273 A1* | 2/2004 | Flacke | ................... | G01S 13/584 |
| | | | | 342/111 |
| 2005/0004719 A1* | 1/2005 | Dickmann | ............ | G01S 13/931 |
| | | | | 701/1 |
| 2005/0168377 A1* | 8/2005 | Kai | ........................ | G01S 7/4008 |
| | | | | 342/128 |
| 2007/0017081 A1* | 1/2007 | Becker | .................. | B25J 9/1684 |
| | | | | 29/429 |
| 2009/0128398 A1* | 5/2009 | Wieland | .............. | G01S 7/52006 |
| | | | | 342/174 |
| 2010/0076708 A1* | 3/2010 | Hukkeri | .............. | G01S 7/52004 |
| | | | | 702/94 |
| 2011/0066393 A1* | 3/2011 | Groll | ....................... | B25J 9/1692 |
| | | | | 73/1.79 |
| 2015/0048968 A1* | 2/2015 | Uyama | .................... | G01S 7/354 |
| | | | | 342/109 |
| 2015/0066412 A1 | 3/2015 | Nordbruch | ..................... | 702/104 |
| 2016/0223645 A1* | 8/2016 | Kim | ........................ | G01S 13/345 |
| 2017/0084175 A1* | 3/2017 | Sedlik | ................... | H04B 1/3822 |
| 2017/0153315 A1* | 6/2017 | Katayama | ................ | G01S 13/38 |
| 2017/0329002 A1* | 11/2017 | Koerber | ................ | H01Q 21/061 |
| 2017/0341593 A1* | 11/2017 | Kuntze | .............. | G02F 1/133603 |
| 2018/0120419 A1* | 5/2018 | Bialer | ..................... | G01S 13/931 |
| 2018/0154901 A1* | 6/2018 | Hasberg | ................. | B60W 40/04 |
| 2018/0284785 A1* | 10/2018 | Berntorp | ................. | G08G 1/166 |
| 2018/0299533 A1* | 10/2018 | Pliefke | ....................... | G01S 7/40 |
| 2019/0023273 A1* | 1/2019 | Ishioka | ................... | G08G 1/167 |
| 2019/0100216 A1* | 4/2019 | Volos | ...................... | G06Q 40/08 |
| 2019/0204425 A1* | 7/2019 | Abari | ....................... | G01S 7/497 |
| 2019/0270452 A1* | 9/2019 | Katsura | ................. | B60W 30/10 |
| 2020/0025910 A1* | 1/2020 | Roh | ........................ | G01S 13/931 |
| 2020/0110153 A1* | 4/2020 | Seler | ...................... | G01S 7/4026 |
| 2020/0209369 A1* | 7/2020 | Koch | ..................... | G01S 7/4972 |
| 2021/0132108 A1* | 5/2021 | Schauer | ................... | B60R 11/00 |
| 2021/0215794 A1* | 7/2021 | Breddermann | ......... | G01S 17/89 |
| 2021/0325897 A1* | 10/2021 | Balogh | ............... | G05D 1/0257 |
| 2021/0327280 A1* | 10/2021 | Choi | ....................... | G08G 1/163 |
| 2022/0009484 A1* | 1/2022 | Jeising | ............ | B60W 30/18154 |
| 2022/0276367 A1* | 9/2022 | Hasegawa | ............... | G01S 13/87 |
| 2022/0324481 A1* | 10/2022 | Cheng | ............... | B60W 60/0027 |
| 2023/0094836 A1* | 3/2023 | Kellner | ................. | G01S 13/582 |
| | | | | 342/52 |
| 2023/0194664 A1* | 6/2023 | Strauss | .................. | G06N 3/044 |
| | | | | 342/196 |
| 2024/0069189 A1* | 2/2024 | Holzknecht | ............. | G01S 13/42 |

FOREIGN PATENT DOCUMENTS

| | | | | |
|---|---|---|---|---|
| CN | 110888113 A | * | 3/2020 | ............. G01S 13/88 |
| DE | 199 62 997 | | 6/2001 | ............. G01D 21/00 |
| DE | 10 2017 006 180 | | 12/2017 | ............. B60R 16/02 |
| DE | 102017006180 A1 | * | 12/2017 | ............. B60R 16/02 |
| EP | 2 631 338 | | 8/2013 | ............. D01F 6/94 |
| EP | 2631668 A1 | * | 8/2013 | ............. G01B 11/14 |
| EP | 1537008 B1 | * | 5/2015 | ............. B25J 9/1684 |
| EP | 3293545 A1 | * | 3/2018 | ........... G01S 13/536 |
| EP | 3306339 A1 | * | 4/2018 | ............. G01S 13/93 |
| EP | 4075407 A1 | * | 10/2022 | ...... B60W 60/00274 |
| EP | 4099056 A1 | * | 12/2022 | ........... G01S 13/343 |
| WO | WO-2004026537 A2 | * | 4/2004 | ............. B25J 9/1684 |
| WO | 2016 087679 | | 6/2016 | ............. G01S 13/93 |

OTHER PUBLICATIONS

Search Report for DE Application No. 10 2019 214 544.2, 5 pages.
Chinese Office Action, Application No. 202080066966.9, 14 pages.

* cited by examiner

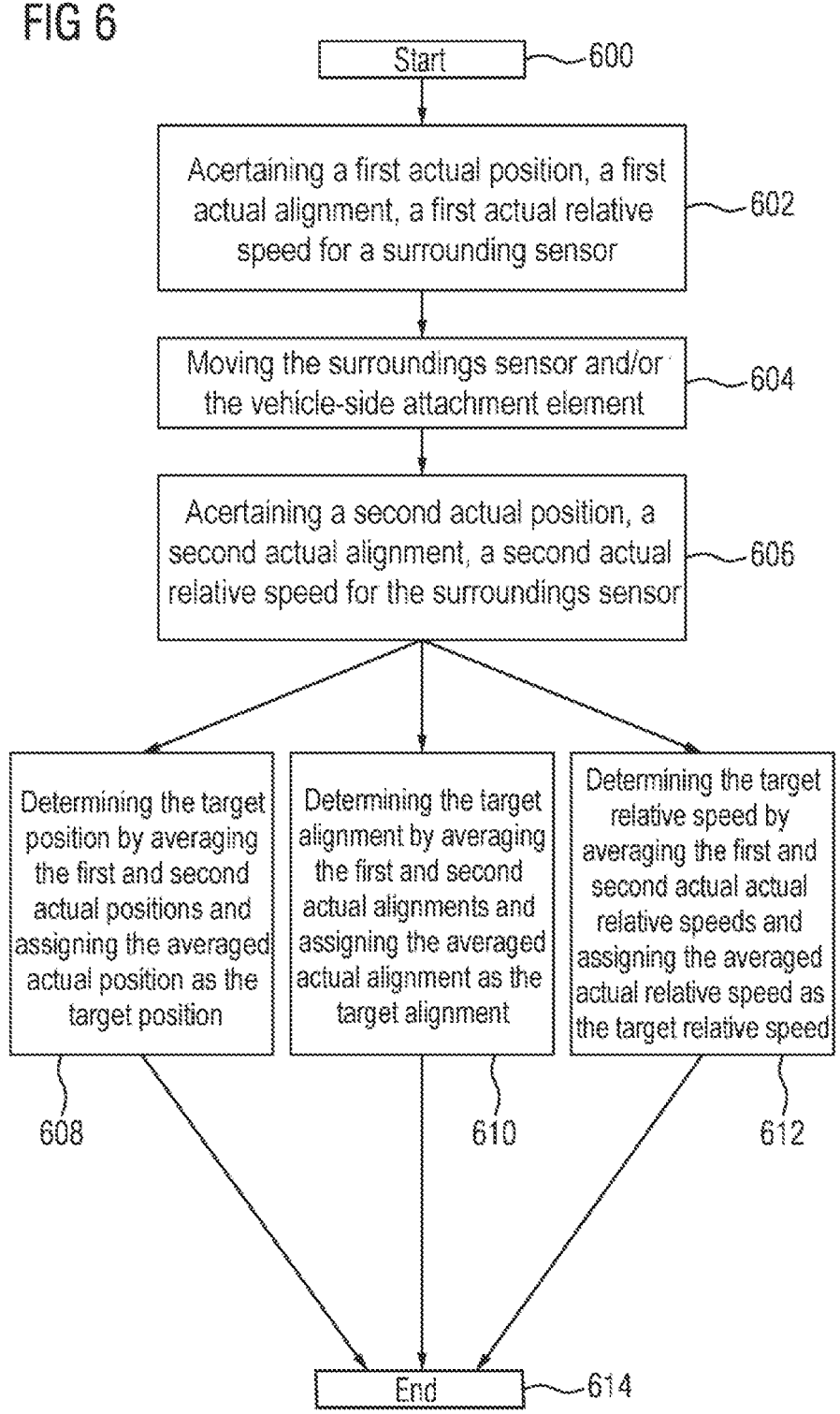

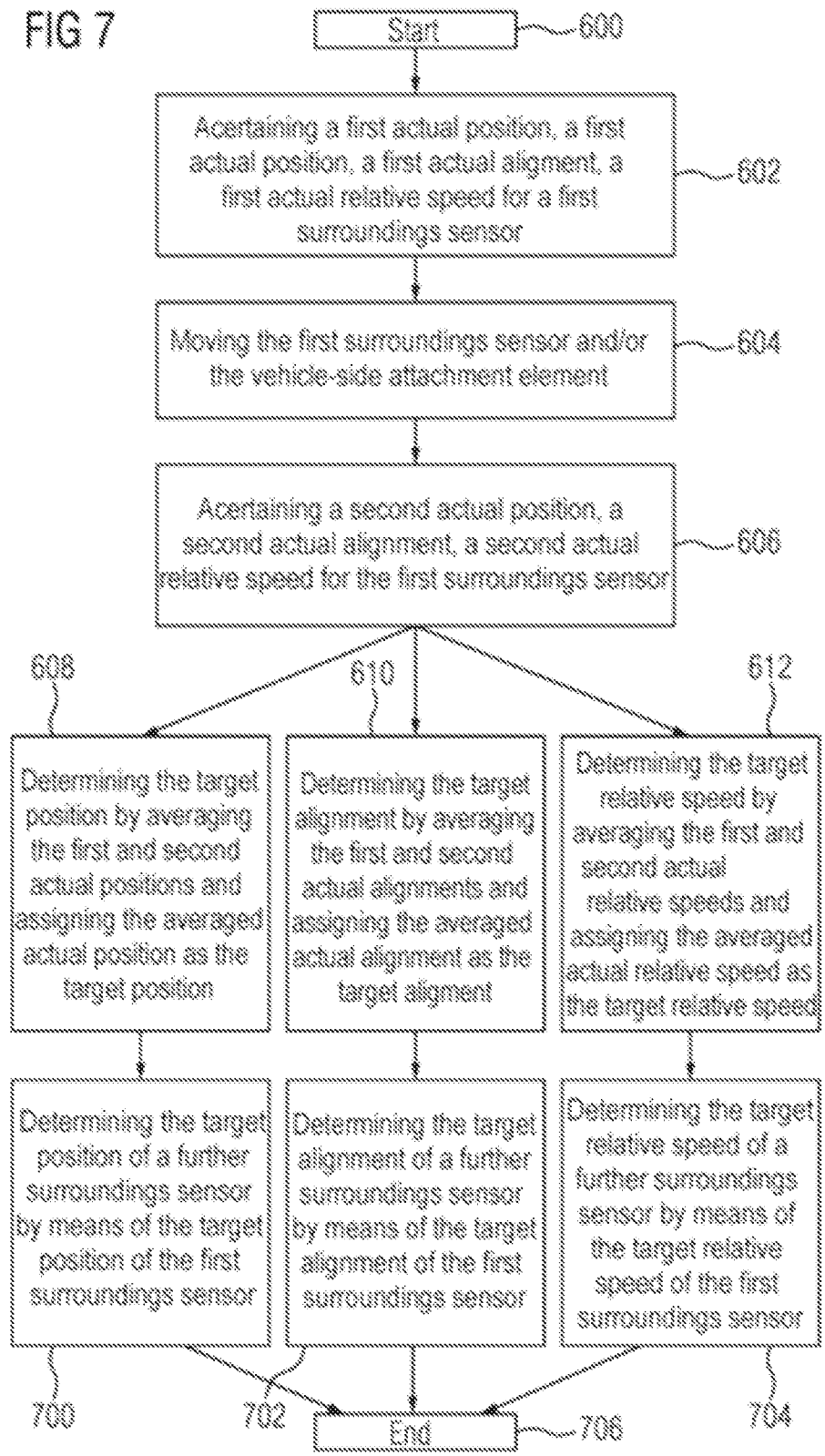

METHOD AND DEVICE FOR DETERMINING A TARGET POSITION OF A SURROUNDINGS SENSOR OF A VEHICLE

CROSS-REFERENCE TO RELATED APPLICATIONS

This application is a U.S. National Stage Application of International Application No. PCT/EP2020/076214 filed Sep. 21, 2020, which designates the United States of America, and claims priority to DE Application No. 10 2019 214 544.2 filed Sep. 24, 2019, the contents of which are hereby incorporated by reference in their entirety.

TECHNICAL FIELD

The present disclosure relates to vehicles. Various embodiments of the teachings herein may include methods and/or systems for determining a target position of a surroundings sensor of a vehicle.

BACKGROUND

Modern vehicles usually have a large number of driver assistance systems that have surroundings sensors for monitoring the surroundings of the vehicle. Such systems provide assistance, for example, when parking, when changing lanes, or implement other functions such as ACC (Adaptive Cruise Control) functions, lane-keeping functions, emergency braking functions, and the like. In order for the systems to function safely and correctly, however, it is necessary for the data provided by the surroundings sensors to represent the real conditions as accurately as possible.

In order to ensure this, the surroundings sensors are usually calibrated with respect to their installation position and their installation alignment (orientation) in the vehicle. If the surroundings sensors are additionally sensors that measure a relative speed, such as radar or ultrasonic sensors, the relative speed measured by the sensors is also calibrated in advance. In this context, the term "calibrate" means that an actual installation position, actual installation alignment and actual relative speed are assigned to a target or presumed target installation position, target alignment and target relative speed. The calibration ensures that the data provided by the surroundings sensors, such as the distance, alignment/pose and, if applicable, the relative speed of an object, correspond to the real conditions. Such a calibration is usually performed using external calibration objects before delivery of the vehicle.

However, it has been shown that in the course of the vehicle's service life, a decalibration of the surroundings sensors can occur due to various influences. This decalibration leads to the data provided by the surroundings sensors no longer reflecting the actual, real conditions. In other words, the surroundings sensor supplies, for example, a distance of 10 cm to an object, even though said distance is actually only 8 cm. Such a discrepancy between the data supplied by the surroundings sensors and the data or conditions actually present can occur, for example, as a result of a settling behavior of the surroundings sensors, as a result of accidents (damage/warping of the vehicle body) involving the vehicle, or as a result of environmental influences, such as impacts of stone chips, etc. The decalibration can not only lead to the driver assistance systems no longer working with the necessary accuracy. In the worst case, decalibration can even pose an increased risk for the vehicle occupants.

SUMMARY

The teachings of the present disclosure include features with which a previously performed calibration of a surroundings sensor can be updated or adjusted in a simple and cost-effective manner. For example, some embodiments of the teachings herein include a method for determining a target position (xSens, ySens, zSens) of a surroundings sensor (12) of a vehicle (14) by means of a vehicle-side attachment element (16, 30, 34) serving as a calibration object, wherein the surroundings sensor (12) and the vehicle-side attachment element (16, 30, 34) are movable relative to each other, wherein the method includes: ascertaining a first actual position of the surroundings sensor (12) in a first relative pose between the surroundings sensor (12) and the vehicle-side attachment element (16, 30, 34), moving the surroundings sensor (12) and/or the vehicle-side attachment element (16, 30, 34) from the first relative pose to a second relative pose between the surroundings sensor (12) and the vehicle-side attachment element (16, 30, 34), ascertaining a second actual position of the surroundings sensor (12) in the second relative pose, and determining the target position (xSens, ySens, zSens) of the surroundings sensor (12) by averaging the first actual position and the second actual position to form an averaged actual position and assigning the averaged actual position as the target position (xSens, ySens, zSens).

In some embodiments, the method further serves to determine a target alignment (alphaSens, betaSens) of the surroundings sensor (12) and includes: ascertaining a first actual alignment of the surroundings sensor (12) in the first relative pose, ascertaining a second actual alignment of the surroundings sensor (12) in the second relative pose, and determining the target alignment (alphaSens, betaSens) of the surroundings sensor (12) by averaging the first actual alignment and the second actual alignment to form an averaged actual alignment and assigning the averaged actual alignment as the target alignment (alphaSens, betaSens).

In some embodiments, the surroundings sensor (12) is furthermore designed to capture a relative speed between the vehicle (12) and an object in the surroundings of the vehicle (12) and the method is furthermore used to determine a target relative speed (vSens) to be ascertained by the surroundings sensor (12), wherein the method additionally includes: ascertaining a first actual relative speed between the surroundings sensor (12) and the vehicle-side attachment element (16, 30, 34) in the first relative pose, ascertaining a second actual relative speed between the surroundings sensor (12) and the vehicle-side attachment element (16, 30, 34) in the second relative pose, and determining the target relative speed (vSens) by averaging the first actual relative speed and the second actual relative speed to form an averaged actual relative speed and assigning the averaged actual relative speed as the target relative speed (vSens).

In some embodiments, the step of moving the surroundings sensor (12) and/or the vehicle-side attachment element (16, 30, 34) from the first relative pose to the second relative pose comprises moving only the vehicle-side attachment element (16, 30, 34) relative to the surroundings sensor (12).

In some embodiments, the vehicle-side attachment element (16, 30, 34) is a mirror (16) of the vehicle (14) that is adjustable by way of a motor and the movement of the vehicle-side attachment element (16, 30, 34) takes place by way of a motor-driven adjustment of the mirror (16).

In some embodiments, the step of moving the surroundings sensor (12) and/or the vehicle-side attachment element (16, 30, 34) from the first relative pose to the second relative pose comprises only moving the surroundings sensor (12) relative to the vehicle-side attachment element (16, 30, 34).

In some embodiments, the surroundings sensor (12) is attached to a hatch (24, 32) of the vehicle that is adjustable by way of a motor and the movement of the surroundings sensor (12) takes place by way of a motor-driven adjustment of the hatch (24, 32).

In some embodiments, the movement of the surroundings sensor (12) is effected by a movement of the surroundings sensor (12) along an additional predetermined calibration path.

In some embodiments, the step of moving the surroundings sensor (12) and/or the vehicle-side attachment element (34) from the first relative pose to the second relative pose comprises moving both the surroundings sensor (12) and the attachment element (34).

In some embodiments, a further calibration object (36) located in the surroundings of the vehicle (14) is used for determining the target position (xSens, ySens, zSens) or the target alignment (alphaSens, betSens) of the surroundings sensor (12) or the target relative speed (vSens) to be ascertained by the surroundings sensor (12).

In some embodiments, the surroundings sensor (12) is a first surroundings sensor and the vehicle furthermore has at least one further, second surroundings sensor (40), and a target position of the at least one further surroundings sensor (40) is determined by means of the target position (xSens, ySens, zSens) of the first surroundings sensor (12).

In some embodiments, a target alignment of the at least one further surroundings sensor (40) is determined by means of the target alignment (alphaSens, betaSens) of the first surroundings sensor (12).

In some embodiments, a target relative speed to be ascertained by the at least one further surroundings sensor is determined by means of the target relative speed (vSens) to be ascertained by the first surroundings sensor (12).

In some embodiments, the surroundings sensor (12) is a radar sensor and the first actual position and/or the one second actual position is/are ascertained by means of a synthetic aperture.

As another example, some embodiments include a device (10) for determining a target position (xSens, ySens, zSens) of a surroundings sensor (12) of a vehicle (14) by means of a vehicle-side attachment element (16, 30, 34) serving as a calibration object, wherein the surroundings sensor (12) and the vehicle-side attachment element (16, 30, 34) are movable relative to each other, and the device (10) has a computing unit (18) for carrying out a method as described herein.

In some embodiments, the device furthermore has the surroundings sensor (12) and the vehicle-side attachment element (16, 30, 34).

BRIEF DESCRIPTION OF THE DRAWINGS

Further features and objects of the present disclosure are apparent to a person skilled in the art by practising the present teaching and taking into consideration the accompanying drawings. In the figures:

FIG. 6 shows a schematic illustration of a flow chart of an embodiment of a method incorporating teachings of the present disclosure; and FIG. 7 shows a schematic illustration of a flow chart of a further embodiment of a method incorporating teachings of the present disclosure.

DETAILED DESCRIPTION

Figure 1:
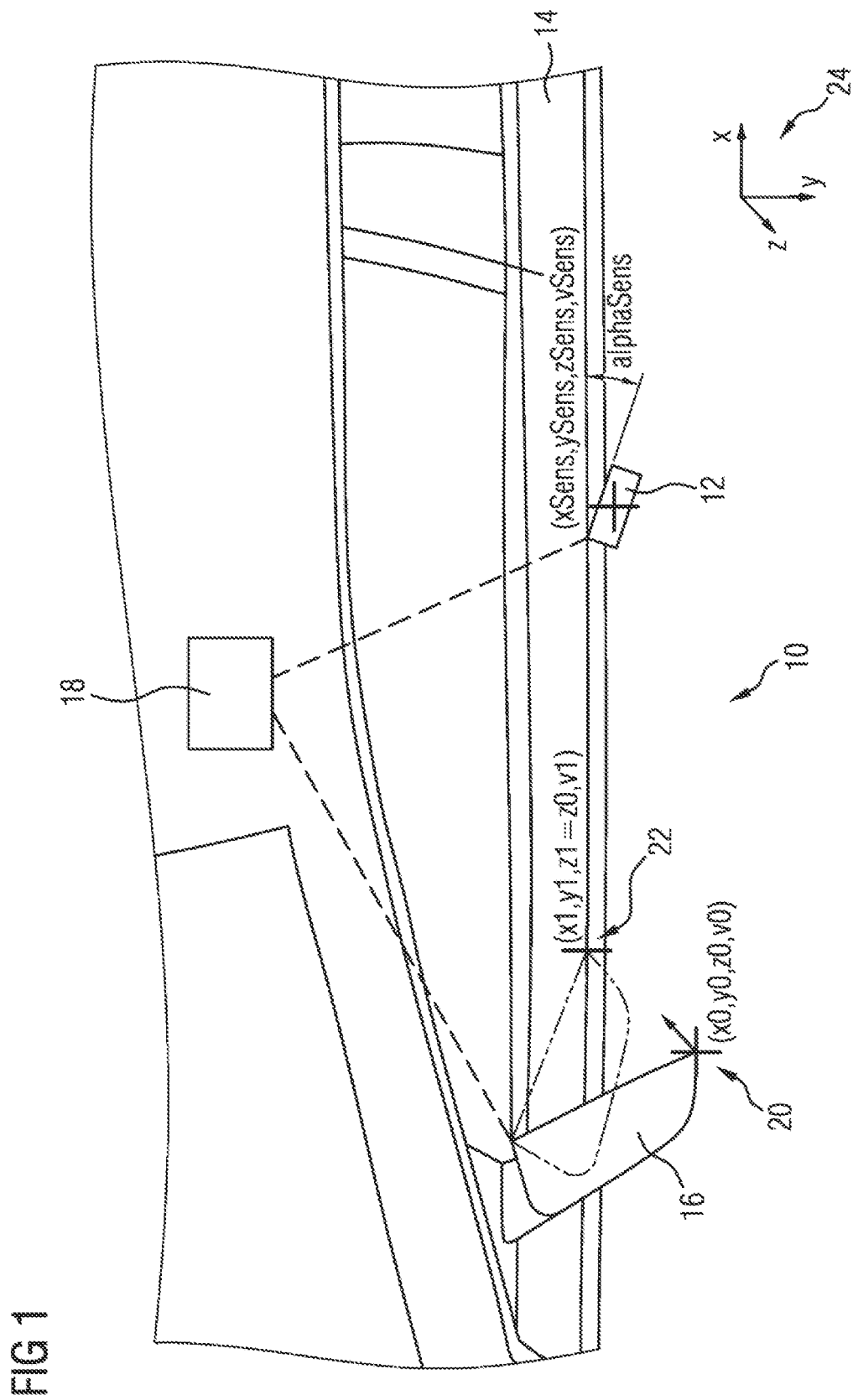
FIG. 1 shows a top view of a vehicle with an embodiment of a device incorporating teachings of the present disclosure.

Some embodiments include a method for determining a target position or a target installation position of a surroundings sensor of a vehicle by means of a vehicle-side attachment element serving as a calibration object, wherein the surroundings sensor and the vehicle-side attachment element are movable relative to each other. The method may comprise: ascertaining a first actual position or a first actual installation position of the surroundings sensor in a first relative pose between the surroundings sensor and the vehicle-side attachment element, moving the surroundings sensor and/or the vehicle-side attachment element from the first relative pose to a second relative pose between the surroundings sensor and the vehicle-side attachment element, ascertaining a second actual position or a second actual installation position of the surroundings sensor in the second relative pose, and determining the target position or the target installation position of the surroundings sensor by averaging the first actual position and the second actual position to form an averaged actual position and assigning the averaged actual position as the target position.

In some embodiments, the actual installation position of the surroundings sensor will, over the course of the vehicle's service life, for example as a result of a settling behavior of the surroundings sensor, as a result of accidents involving the vehicle, or as a result of environmental influences, such as impacts of stone chips, and the associated warping of the vehicle body taking place under certain circumstances, deviate from the original (factory-set) target installation position. Due to the deviation between the actual installation position or actual position of the surroundings sensor and the target installation position or target position of the surroundings sensor, the sensor data could become decalibrated, with the result that the data provided by the surroundings sensor are inaccurate or incorrect.

The present disclosure describes methods and/or systems for recalibrating a surroundings sensor that has been decalibrated without additional, external calibration objects, or in correspondingly adjusting the previously set calibration. Therefore, some embodiments use a vehicle-side attachment element as the calibration object, and an external calibration object is therefore no longer required. In addition, a relative movement between the surroundings sensor and the vehicle-side attachment element can be used to obtain a plurality of relative poses between the vehicle-side attachment element and the surroundings sensor, for which a respective actual position can then be ascertained that are then transformed by averaging to an averaged actual position, and this averaged actual position is then used as the target position or target installation position of the surroundings sensor.

In the context of this disclosure, the term "averaging" generally means forming a further value from given values. The term "averaging" thus does not only mean an arithmetic, geometric, quadratic or weighted averaging of the actual positions, but also the application of other calculation rules to the ascertained actual positions, such as mathematical filter functions, regressions, etc.

Since it is possible on account of the movement between the vehicle-side attachment element and the surroundings sensor to take into account a plurality of actual positions of the surroundings sensor and, in addition, a vehicle-side attachment element (rather than an object external to the vehicle) is used as the calibration object, a simple and cost-effective option is provided for reliably updating or adjusting a previously performed calibration of the surroundings sensor with respect to its target position or target installation position during the vehicle's service life.

In some embodiments, the method may be used to determine a target alignment or a target installation alignment of the surroundings sensor. In the context of this disclosure, the term "alignment" can be understood to mean an orientation or an angular position of a sensor plane of the surroundings sensor with respect to reference planes of a coordinate system. The alignment of the surroundings sensor is important in order to be able to correctly determine not only the position but also the angular position of a subject in the surroundings relative to the surroundings sensor. Since over the course of the vehicle's service life decalibration with respect to the target installation alignment of the surroundings sensor can also take place, the method may therefore comprise the following additional steps: ascertaining an actual alignment or an actual installation alignment of the surroundings sensor in the first relative pose, ascertaining a second actual alignment or a second actual installation alignment of the surroundings sensor in the second relative pose, i.e., in the relative pose that is present after the surroundings sensor and/or the vehicle-side attachment element were moved relative to one another, and finally determining the target alignment or the target installation alignment of the surroundings sensor by averaging the first actual alignment and the second actual alignment to form an averaged actual alignment and assigning the averaged actual alignment as the target alignment. These additional steps make it possible, for example, to recalibrate a settling behavior with respect to an angular position of a sensor plane of the surroundings sensor such that the actual installation alignment of the surroundings sensor is assigned as the target installation alignment of the surroundings sensor.

In some embodiments, the method may be furthermore used to determine a target relative speed to be ascertained by the surroundings sensor. This refinement is particularly suitable for surroundings sensors which, in addition to a position and alignment of a surroundings object, can additionally ascertain a relative speed between the vehicle (or the sensor) and the surroundings object. Such surroundings sensors are, for example, radar sensors, ultrasonic sensors, or other sensors known to a person skilled in the art.

Since such sensors can also be decalibrated with respect to the determination of the relative speed, the method may include: ascertaining a first actual relative speed between the surroundings sensor and the vehicle-side attachment element in the first relative pose, ascertaining a second actual relative speed between the surroundings sensor and the vehicle-side attachment element in the second relative pose, and determining the target relative speed by averaging the first actual relative speed and the second actual relative speed to form an averaged actual relative speed and assigning the averaged actual relative speed as the target relative speed.

In some embodiments, it is thus possible, in addition to the already mentioned calibration of the target position and the target alignment of the surroundings sensor, to also calibrate the target relative speed to be ascertained by the surroundings sensor. Since there is again no need for an external calibration object and instead a vehicle-side attachment element serves as the calibration object, it is also possible in this preferred refinement to easily and cost-effectively (re)calibrate modern surroundings sensors such as radar or ultrasonic sensors during the vehicle's service life.

In some embodiments, the movement of the surroundings sensor and/or of the vehicle-side attachment element from the first relative pose to the second relative pose comprises moving only the vehicle-side attachment element relative to the surroundings sensor. In other words, in this refinement, only the vehicle-side attachment element is moved relative to the surroundings sensor, and not the surroundings sensor relative to the vehicle-side attachment element. This has the advantage that the (stationary) surroundings sensor always has the same field of view in the different relative poses between the surroundings sensor and the vehicle-side attachment element. Since only the calibration object, specifically the vehicle-side attachment element, moves within the fixed field of view of the surroundings sensor, fewer disruptive influences arise in the determination of the target position, target alignment, and target relative speed. In addition, this type of (re)calibration requires less computing power compared to a field of view that changes in the respective relative pose.

If the vehicle-side attachment element is, for example, a motor-driven adjustable mirror, in particular side mirror, of the vehicle, the movement of the vehicle-side attachment element may be effected by a motor-driven adjustment of the mirror. The idea here is that in modern vehicles, the side mirrors in particular are already usually adjustable by way of a motor. The motor-driven adjustment of the mirrors can then be used to move the vehicle-side attachment element relative to the surroundings sensor in a manner such that the target position, target alignment, and target relative speed of the surroundings sensor can be determined easily and quickly.

The motor-driven adjustment of the mirror also has the advantage that the position, alignment/angular position, and speed of the mirror is known for every relative pose between the mirror and the surroundings sensor, and thus fixed or predetermined reference data for calibrating the surroundings sensor with respect to its installation position, installation alignment, and the relative speed to be ascertained thereby are possible. In the context of this disclosure, the term "mirror" does not actually refer to the reflective surface, but rather to the movable attachment element of the vehicle. Whether the reflecting surface is a glass surface or a camera is irrelevant in this context. In this context, the term "motor-driven" adjustment of the mirror can also mean an adjustment of the mirror by means of a piezomotor mechanism. In some embodiments, rather than a motor-driven adjustment of the mirror, a manual adjustment of the mirror takes place and its progression over time is captured by means of a corresponding sensor.

In some embodiments, moving the surroundings sensor and/or the vehicle-side attachment element from the first relative pose to the second relative pose comprises moving only the surroundings sensor relative to the vehicle-side attachment element. In other words, in this refinement, only the surroundings sensor is moved relative to the vehicle-side attachment element, but not the vehicle-side attachment element relative to the surroundings sensor. This may have the disadvantage that the field of view of the surroundings sensor changes in the respective relative pose between the surroundings sensor and the vehicle-side attachment element due to the movement of the surroundings sensor. However, any expedient vehicle-side attachment element can be used to calibrate the surroundings sensor. In addition to the mirrors already mentioned, this also includes other distinctive features of the vehicle, such as a door handle, an A-pillar, a B-pillar, a C-pillar, a headrest, a rear-view mirror etc., and therefore all internal or external attachment elements of the vehicle that represent a distinctive point in the field of view of the surroundings sensor.

If—as is usually the case—the surroundings sensor is additionally attached to a motor-driven adjustable hatch, such as a tailgate, a vehicle door, or a tank cap of the vehicle, then the movement of the surroundings sensor relative to the vehicle-side attachment element can take place by way of a motor-driven adjustment of the hatch. Since hatches such as tailgates, vehicle doors or the like in modern vehicles are usually adjustable by way of a motor anyway, this motor-driven adjustment can be used to move the surroundings sensor relative to the vehicle-side attachment element in a manner such that the target position, target alignment, and target relative speed of the surroundings sensor can be determined in turn quickly and easily. A "motor-driven" adjustment of the hatch can be understood not only as an active motor-driven adjustment of the hatch, but also as braking/deceleration of the hatch that counteracts a manual movement of the hatch by a motor.

In some embodiments, due to the motor-driven adjustment of the hatch, the position, alignment/angular position, and speed of the surroundings sensor relative to the vehicle-side attachment element is known in every relative pose between the surroundings sensor and the vehicle-side attachment element and thus fixed or predetermined reference data for calibrating the surroundings sensor with respect to its installation position, installation alignment, and the relative speed to be ascertained thereby are possible. In some embodiments, the surroundings sensor to be moved along an additional predetermined calibration path (for example by means of a guide that is specially set up for this purpose).

In some embodiments, moving the surroundings sensor and/or the vehicle-side attachment element from the first relative pose to the second relative pose comprises moving both the surroundings sensor and the attachment element. In other words, both the surroundings sensor and the attachment element are moved in this refinement. Due to the movement of the surroundings sensor and the attachment element, a higher degree of accuracy or a more precise calibration of the surroundings sensor can be carried out.

In some embodiments, a further calibration object located in the surroundings of the vehicle is used to determine the target position or target alignment or target relative speed. This calibration object can be, for example, a ground, a street sign, a lane marking, or another distinctive object in the surroundings of the vehicle that can serve as a calibration object. In particular, this vehicle-external, further calibration object can also be a distinctive point of a vehicle driving ahead or behind. With the aid of an additional calibration object, which can now also be present outside of the vehicle, the accuracy of the calibration can be further increased, for example also by a possibly dynamic relative movement between the surroundings sensor and the additional calibration object.

In some embodiments, the surroundings sensor is a first surroundings sensor and the vehicle has at least one further, second surroundings sensor, wherein a target position of the at least one further (second) surroundings sensor is determined by means of the target position of the first surroundings sensor.

In some embodiments, a target alignment of the at least one further (second) surroundings sensor is furthermore determined by means of the target alignment of the first surroundings sensor.

In some embodiments, a target relative speed of the at least one further (second) surroundings sensor is furthermore determined by means of the target relative speed of the first surroundings sensor. As a result, the target position, the target alignment, and the target relative speed of further surroundings sensors of the vehicle can be determined with the aid of the target position, target alignment, and target relative speed of the (first) surroundings sensor. In other words, it is possible for a plurality of surroundings sensors to be calibrated using one another.

In some embodiments, the surroundings sensor is a radar sensor and the first actual position and/or the second actual position of the surroundings sensor can be ascertained by means of a synthetic aperture. Methods of this type are based on the idea that the aperture of a large antenna of the surroundings sensor is synthesized from the intensity and phase position of received radar echoes of the surroundings sensor. As a result, a higher spatial resolution can be achieved for determining the first and/or second actual position.

In some embodiments, there is a device for determining a target position of a surroundings sensor of a vehicle by means of a vehicle-side attachment element serving as a calibration object, wherein the surroundings sensor and the vehicle-side attachment element are movable relative to each other. The device may have, inter alia, a computing unit for carrying out a method according to the first aspect or refinements thereof. This creates a device with which a previously set calibration can also be updated or adjusted during the vehicle's service life.

In some embodiments, the device furthermore has the surroundings sensor and the vehicle-side attachment element. Advantageous refinements of the method should, where applicable to the device, also be regarded as advantageous refinements of the device. Elements having an identical design or function are provided with the same reference designations throughout the figures.

Reference is first made to FIG. 1, which shows a device 10 for determining a target position, a target alignment, and a target relative speed of a surroundings sensor 12 of a vehicle 14. For this purpose, the device 10 also has, in addition to the surroundings sensor 12, a vehicle-side attachment element 16 that serves as a calibration object and, in the specific example in FIG. 1, is a mirror that is adjustable by way of a motor, in particular a side mirror, of the vehicle 14. The device 10 furthermore has a computing unit 18, which is operationally connected to the vehicle-side attachment element or side mirror 16 and the surroundings sensor 12. The surroundings sensor 12 is, for example, a radar sensor or an ultrasonic sensor.

As can be seen in FIG. 1, the side mirror 16 that is adjustable by way of a motor can be moved between a first position 20 and a second position 22. The movement of the side mirror 16 results in a first relative pose between the side mirror 16 and the surroundings sensor 12, which is defined by the first position of the side mirror 16 relative to the position of the surroundings sensor 12, and a second relative pose between the side mirror 16 and the surroundings sensor 12, which is defined by the second position 22 of the side mirror 16 relative to the position of the surroundings sensor 12. The positions 20, 22 and the position of the surroundings sensor, which can be an installation position of the surroundings sensor 12, for example, is specified in x, y and z coordinates using a Cartesian coordinate system, which has the reference sign 24 in FIG. 1.

For example, the side mirror 16 has the Cartesian coordinates x0, y0, z0 in the first position and the Cartesian coordinates x1, y1 and z1 in the second position 22. The x-axis of the Cartesian coordinate system here designates a front-rear direction with respect to the vehicle 14, the z-axis of the Cartesian coordinate system designates a top-bottom direction with respect to the vehicle 14, and the y-axis designates a direction perpendicular to the x-axis and perpendicular to the z-axis and points away from the vehicle 14. The coordinate system does not have to be a Cartesian coordinate system, but rather can be chosen arbitrarily. The coordinate system 24 shown in FIG. 1 serves only to illustrate the present teaching.

Since, in the specific example of FIG. 1, the side mirror 16 moves in the xy-plane, the z coordinate in the position 22 has the same value as the z-coordinate in the position 20. This too is merely an example and should not be construed as being limiting.

Figure 2:
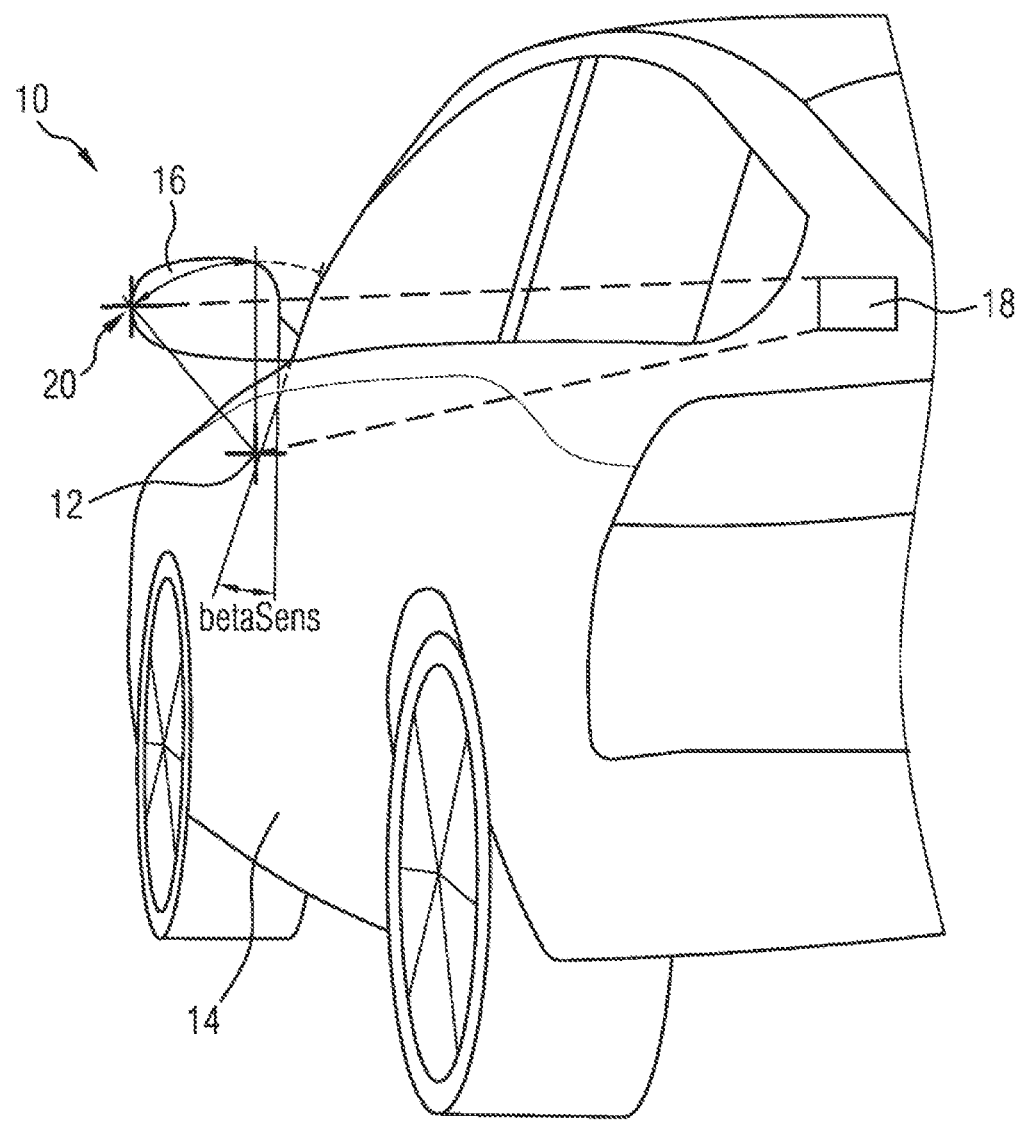
FIG. 2 shows a side view of a vehicle incorporating teachings of the present disclosure.

FIG. 1 further shows that the side mirror 16 has a speed v0 in the first position 20 and the side mirror has a speed v1 in the second position 22. By contrast, the surroundings sensor 12 has an installation position that has been set at the factory and is defined by the Cartesian coordinates xSens, ySens and zSens. Furthermore, a sensor plane of the surroundings sensor 12 has an angle alphaSens in the xy-plane. As indicated in FIG. 2 for further illustration, the sensor plane of the surroundings sensor 12 additionally has an angle betaSens in the xz-plane. The surroundings sensor 12 can furthermore ascertain a relative speed with respect to an object in the surroundings, such as the side mirror 16. This is generally indicated by the designation vSens in FIG. 1.

The surroundings sensor 12 can determine both the position (given as an example by the x, y, z coordinates) and the spatial pose or alignment (given as an example by angles with respect to the xy- and xz-planes) of the side mirror 16 relative to the sensor plane of the surroundings sensor 12, and also a relative speed between the side mirror 16 and the surroundings sensor 12, and do so in every relative pose between the side mirror 16 and the surroundings sensor 12, i.e. in every position 20 and 22.

In other words, the surroundings sensor 12 ascertains, for example, in the first position 20 of the side mirror 16, the coordinates x0, y0 and z0 and the angles of the side mirror 16 with respect to the xy- or xz-plane (not shown for clarity) and also a relative speed v0 between the side mirror 16 and the surroundings sensor 12. In the second position 22 of the side mirror 16, the surroundings sensor 12 ascertains, for example, the coordinates x1, y1 and z1, the angles of the side mirror 16 with respect to the xy- or xz-plane (not shown for clarity), and also a relative speed v1 between the side mirror 16 and the surroundings sensor 12.

For each of these relative poses between the side mirror 16 and the surroundings sensor 12 (i.e. for each position 20, 22), the surroundings sensor 12 thus supplies data sets that describe a position and a pose/alignment of the side mirror 16 relative to the surroundings sensor 12 and also a relative speed between the side mirror 16 and the surroundings sensor 12. Since the side mirror 16 moves along a specified path due to the motor-driven adjustment and therefore both the speed and the pose/alignment and also the position of the side mirror 16 relative to the surroundings sensor 12 are known at any time point during the movement, the computing unit 18 can ascertain, on the basis of the data sets made available by the surroundings sensor 12, the real position or alignment, i.e. the actual position and actual alignment of the surroundings sensor 12, and also the real relative speed, i.e. the actual relative speed between the side mirror 16 and the surroundings sensor 12, for each of the positions 20, 22. Then, the computing unit 18 averages the actual positions obtained to form an averaged actual position, the computing unit 18 averages the actual alignments obtained to form an averaged actual alignment, and the computing unit 18 averages the actual relative speeds obtained to form an averaged actual relative speed. The averaged actual position is finally assigned or stored as the actual position or as the target position of the surroundings sensor 12 (in the form of the coordinates xSens, ySens and zSens). Analogously, the averaged actual alignment is assigned or stored as the actual alignment or as the target alignment of the surroundings sensor 12 (in the form of the angles alphaSens, betaSens). Analogously, the averaged actual relative speed is assigned or stored as the target relative speed (in the form of vSens).

In this way, an installation position of the surroundings sensor 12 that has been stored for example at the factory is updated or adjusted, since the actual installation position of the surroundings sensor 12 is assigned as the target installation position. Analogously, an installation alignment of the surroundings sensor 12 that has been stored for example at the factory is updated or adjusted, since the actual installation alignment of the surroundings sensor 12 is assigned as the target installation alignment. Analogously, a relative speed that has been stored for example at the factory and is to be ascertained by the surroundings sensor 12 is updated or adjusted by assigning the actual relative speed ascertained by the surroundings sensor 12 as the target relative speed. The update increases the accuracy of the data made available by the surroundings sensor 12 and improves the reliability of the surroundings sensor 12 or the reliability of the driver assistance systems connected to the surroundings sensor 12.

Figure 3:
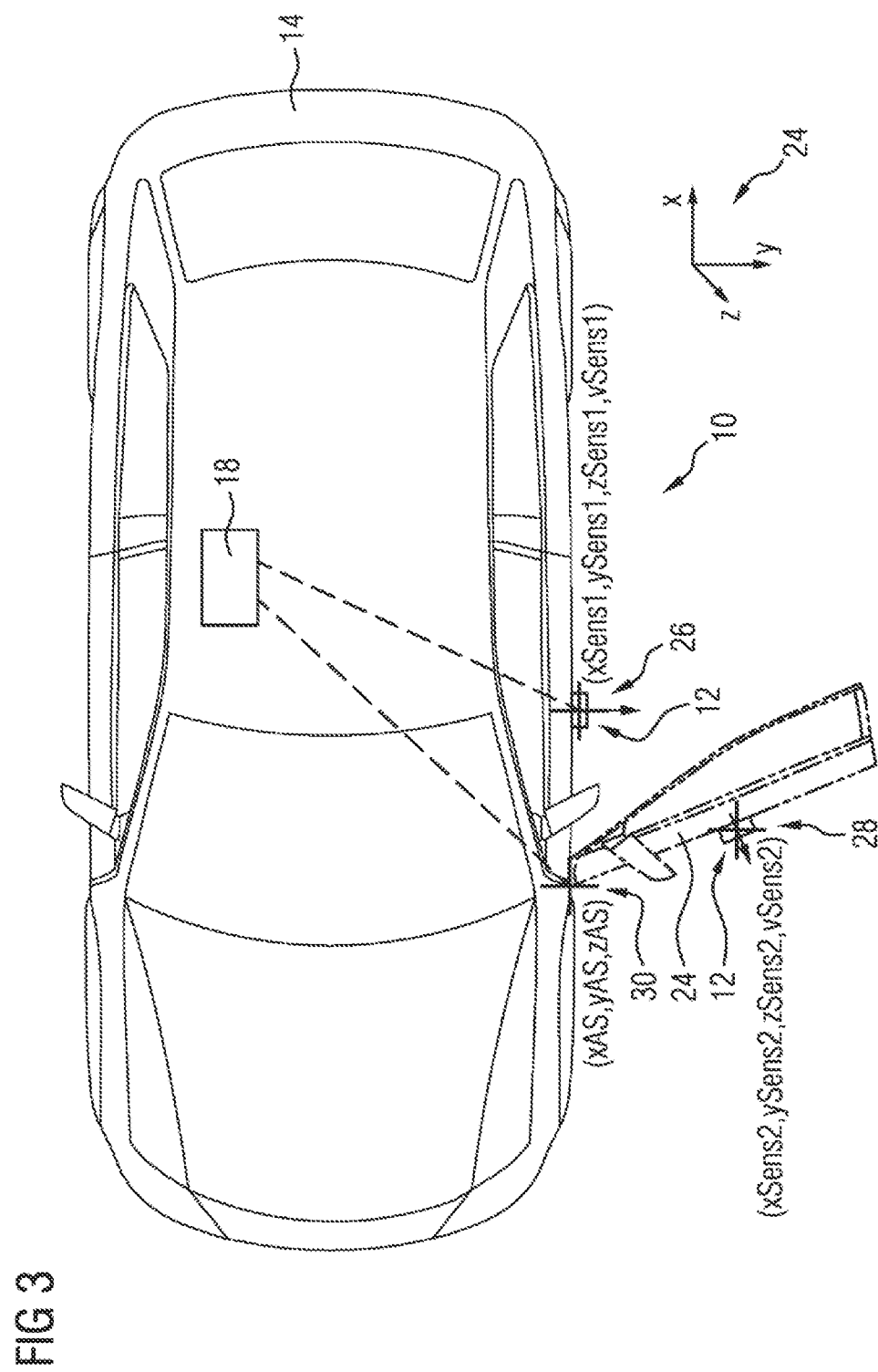
FIG. 3 shows a further top view of a vehicle with a further embodiment of a device incorporating teachings of the present disclosure.

Reference is now made to FIG. 3, which shows a further device 10 for determining a target position, target alignment, and target relative speed of the surroundings sensor 12. In contrast to the device 10 from FIG. 1, however, it is not the vehicle-side attachment element that is moved in the device 10 from FIG. 3, but rather the surroundings sensor 12 is moved. As is the case with most modern vehicles, the surroundings sensor 12 is located on a hatch 24 of the vehicle 14. In the specific example in FIG. 3, the hatch 24 is a side door of the vehicle 14. In other embodiments (not shown), the hatch 24 may also be a tailgate, a tank cap, or another movable hatch of the vehicle 14.

The hatch or side door 24 is also adjustable by way of a motor. The motor-driven adjustment of the hatch 24 allows the surroundings sensor 12 to move along a specified path. The movement of the side door 24 in turn results in a change in the relative pose between the surroundings sensor 12 and the vehicle-side attachment element. The surroundings sensor 12 in FIG. 3 is therefore shown in two positions 26, 28 as an example. In the first position 26, the hatch or side door 24 is shown in the closed state and the surroundings sensor 12 has the coordinates xSens1, ySens1, zSens1 and the speed vSens1. In the second position 28, the hatch or side door 24 is in an open state and the surroundings sensor 12 has the coordinates xSens2, ySens2, zSens2 and the speed vSens2.

Another difference between the device 10 in FIG. 3 and the device 10 in FIG. 1 is that the vehicle-side attachment element is not a side mirror (as shown in FIG. 1), but the A-pillar of the vehicle 14, which is denoted by the reference sign 30. In the specific example of FIG. 3, the A-pillar 30 is thus used as a calibration object for the surroundings sensor 12.

The surroundings sensor 12 can now supply data sets for each of the positions 26, 28 or for each relative pose between the surroundings sensor 12 and the A-pillar 30, which describe a position and a pose/alignment of the A-pillar 30 relative to the surroundings sensor 12 and also a relative speed between the A-pillar 30 and the surroundings sensor 12. Since the hatch 24 and thus the surroundings sensor 12 move along a specified path due to the motor-driven adjustment of the hatch 24 and therefore both the speed and the pose/alignment and also the position of the surroundings sensor 12 relative to the A-pillar 30 are known at any time point during the movement, the computing unit 18 can ascertain, on the basis of the data sets made available by the surroundings sensor 12, the real position or alignment, i.e. the actual position and actual alignment of the surroundings sensor 12, and also the real relative speed, i.e. the actual relative speed between the A-pillar 30 and the surroundings sensor 12, for each of the positions 26, 28 or each of the relative poses.

Analogously to the procedure already described in connection with FIG. 1, the computing unit 18 then averages the obtained actual positions to form an averaged actual position or the computing unit 18 averages the obtained actual alignments to form an averaged actual alignment or the computing unit 18 averages the obtained actual relative speeds to form an averaged actual relative speed and stores the averaged actual position as the real position or target position (in the form of xSens, ySens, zSens) of the surroundings sensor 12 or stores the averaged actual alignment as the real alignment or target alignment of the surroundings sensor 12 (in the form of the angles alphaSens, betaSens) or the averaged actual relative speed between the surroundings sensor 12 and the A-pillar 30 is stored as the target relative speed (in form of vSens).

A movement of the surroundings sensor 12 relative to the vehicle-side attachment element or to the A-pillar 30 provides, among other things, that non-movable, vehicle-side attachment elements can now also be used as calibration objects. For example, it is also conceivable that, rather than the A-pillar 30, a rear-view mirror, a B-pillar, a C-pillar, a headrest or another expedient internal or external vehicle-side attachment element can be used as the calibration object.

Figure 4:
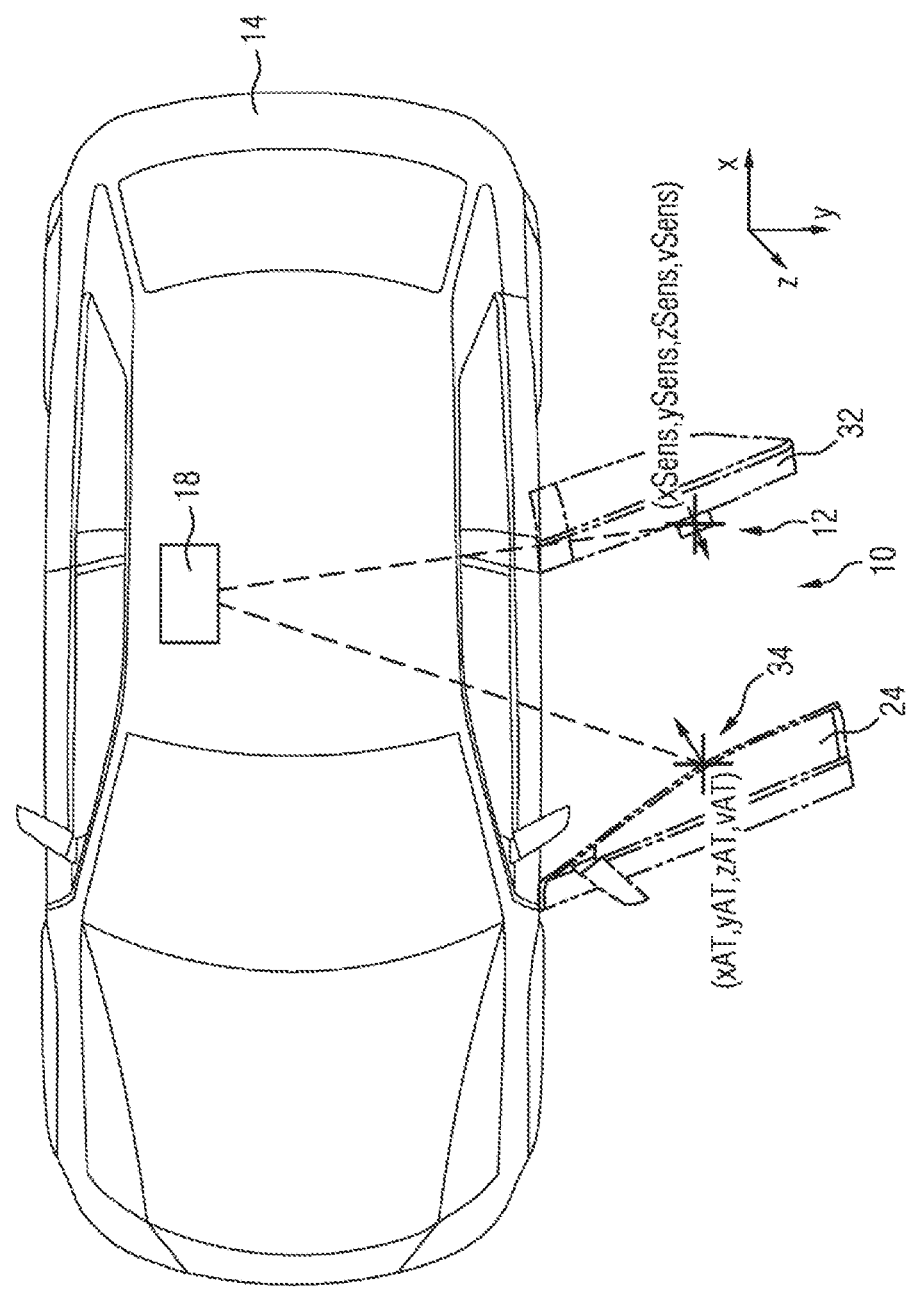
FIG. 4 shows a further top view of a vehicle with a further embodiment of a device incorporating teachings of the present disclosure.

Reference is now made to FIG. 4, which shows a further device 10 for determining a target position, target alignment, and target relative speed of the surroundings sensor 12. In contrast to the device 10 of FIG. 1 and in contrast to the device 10 of FIG. 3, in the device 10 of FIG. 4 both the surroundings sensor 12, which in the specific example of FIG. 4 is mounted on a hatch 32 that is adjustable by way of a motor or on a rear side door, and also the vehicle-side attachment element, which in the specific example of FIG. 4 is an inner door handle 34 of the hatch or of the front side door 24, are moved.

For a better overview, the specific example in FIG. 4 shows the rear side door 32 or the surroundings sensor 12 in only one position (represented by the coordinates xSens, ySens, zSens and the speed vSens) and the vehicle-side attachment element or the inner door handle 34 is also shown in only one position (represented by coordinates xAT, yAT, zAT and the speed vAT).

Since both the rear side door 32 and the front side door 24 can be adjusted by way of a motor and since consequently both the surroundings sensor 12 and the vehicle-side attachment element or the inner door handle 34 are moved along a specified path, the relative speed between the surroundings sensor 12 and the vehicle-side attachment element 34, and also the pose/alignment and the position of the vehicle-side attachment element 34 relative to the surroundings sensor 12 are known for each relative pose between the surroundings sensor 12 and the vehicle-side attachment element 34.

Therefore, on the basis of the data sets made available by the surroundings sensor 12, the computing unit 18 can in turn ascertain the real position or alignment, i.e. the actual position and actual alignment of the surroundings sensor 12, and also the real relative speed, i.e. the actual relative speed between the vehicle-side attachment element 34 and the surroundings sensor 12, for each relative pose between the vehicle-side attachment element 34 and the surroundings sensor 12. The computing unit 18 then again averages the obtained actual positions to form an averaged actual position, or the computing unit 18 averages the obtained actual alignments to form an averaged actual alignment, or the computing unit 18 averages the obtained actual relative speeds to form an averaged actual relative speed and the computing unit 18 assigns the averaged actual position as the target position of the surroundings sensor 12 or the averaged actual alignment as the target alignment of the surroundings sensor 12 or the averaged actual relative speed between the surroundings sensor 12 and the vehicle-side attachment element 34 as the target relative speed.

A movement of the surroundings sensor 12 and the vehicle-side attachment element 34, among other things, provides that more and more varied relative poses can be generated during the movement of the surroundings sensor 12 and the vehicle-side attachment element 34 and, as a result, greater accuracy can be achieved when determining the target position or target alignment or target relative speed.

Figure 5:
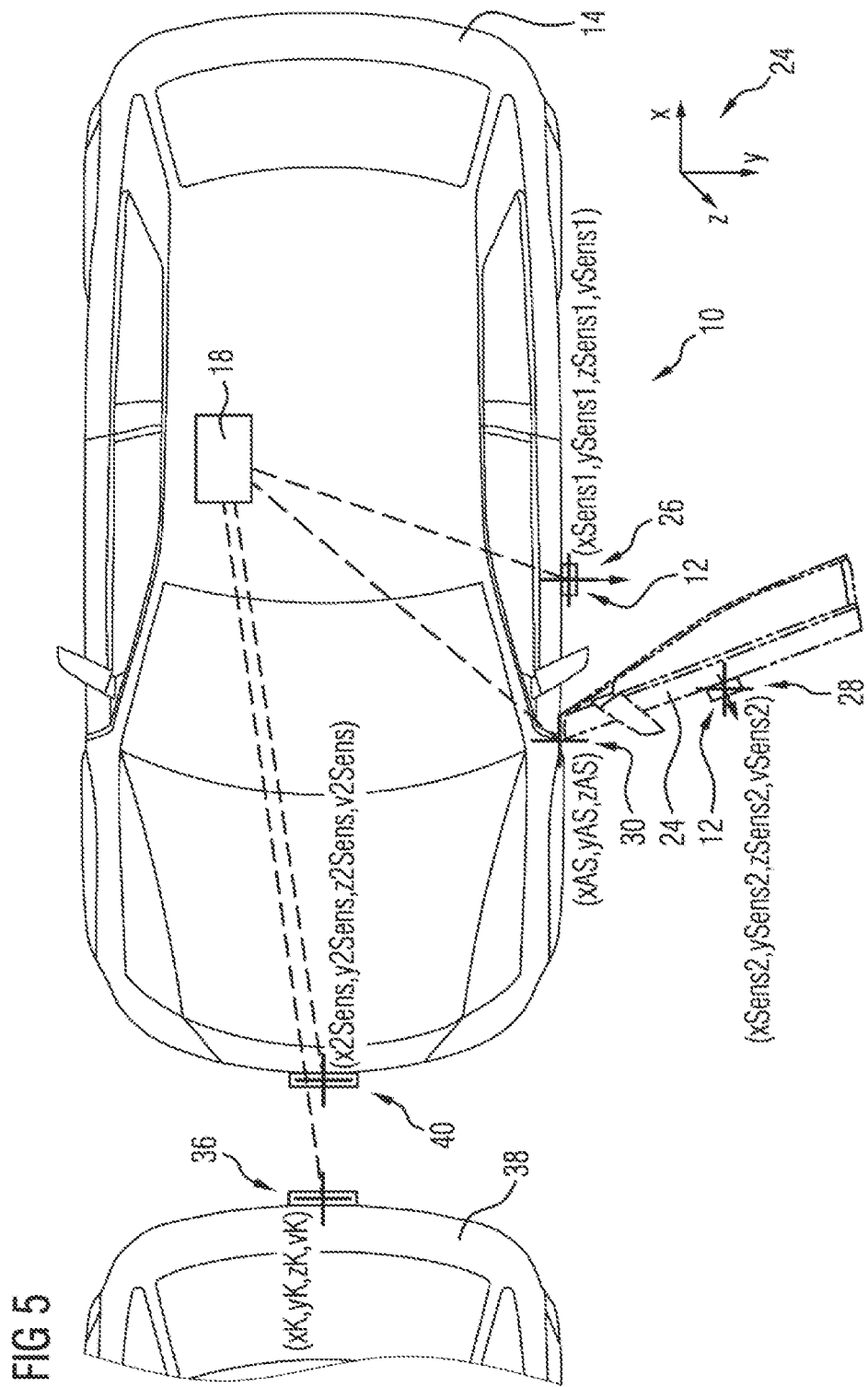
FIG. 5 shows a further top view of a vehicle with a further embodiment of a device incorporating teachings of the present disclosure.

Reference is now made to FIG. 5, which shows a further device 10 for determining a target position, target alignment, and target relative speed of the surroundings sensor 12. In contrast to the devices described so far, a further calibration object 36 located in the surroundings of the vehicle 14 is used in the device 10 of FIG. 5, in addition to the vehicle-side attachment element (A-pillar 30), to determine the target position or the target alignment or the target relative speed of the surroundings sensor 12. In the specific example of FIG. 5, the further or additional calibration object 36 is a distinctive point of a vehicle 38 driving in front. The distinctive point can be the license plate of the vehicle 38 driving in front, for example. In other embodiments (not shown), the additional calibration object 36 can also be a ground, a street sign, a lane marking or another distinctive object in the surroundings of the vehicle 14.

The accuracy of the calibration can be further increased with the aid of the additional calibration object 36, since the calibration object 36 can be used as an additional reference object for determining the target position, target alignment, and target relative speed of the surroundings sensor 12. If, as in the specific example of FIG. 5, the additional calibration object 36 is, for example, a distinctive point of a vehicle 38 driving in front, the position (designated by the coordinates xK, yK, zK) and the relative speed between the additional calibration object 36 and the additional surroundings sensor 40 (designated by vK) can be ascertained, for example, by means of a further surroundings sensor 40 of the vehicle 14, and the data sets obtained from the further surroundings sensor 40 can be used in addition to the data sets obtained from the surroundings sensor 12 by means of the computing unit 18 to determine the target position, target alignment, and target relative speed for the surroundings sensor 12. The surroundings sensor 40 can also be a higher-level computing and receiving unit of the vehicle 14 that can bidirectionally exchange data with the surroundings sensor 12.

However, it is also possible for the further surroundings sensor 40 to be calibrated with respect to its own target position, target alignment, and target relative speed with the aid of the already determined target position, target alignment, and target relative speed of the surroundings sensor 12. For this purpose, the computing unit 18 can, for example, take into account the relative poses of the surroundings sensors 12, 40, the relative alignments of the surroundings sensors 12, 40, and the relative speeds in each case ascertained by the surroundings sensors 12, 40.

Reference is now made to FIG. 6, which shows a schematic illustration of a flow chart of a method for determining a target position, a target alignment, or a target relative speed of a surroundings sensor incorporating teachings of the present disclosure. The method begins with step 600.

This is followed by step 602, in which a first actual position, a first actual alignment, and a first actual relative speed for the surroundings sensor, for example the surroundings sensor 12, are ascertained, for example by means of the computing unit 18.

In the next step 604, the surroundings sensor 12 and/or the vehicle-side attachment element is/are moved. Depending on the refinement, the vehicle-side attachment element (side mirror) 16 can for this purpose be moved relative to the surroundings sensor 12, as was described, for example, in connection with FIG. 1. However, as was described in connection with FIG. 3, the surroundings sensor 12 can also be moved relative to the vehicle-side attachment element (A-pillar 30). It is also conceivable that, as was mentioned in connection with FIG. 4, both the surroundings sensor 12 and the vehicle-side attachment element (inner door handle) 34 are moved. By moving the surroundings sensor 12 and/or the vehicle-side attachment element, a first relative pose present between the surroundings sensor 12 and the vehicle-side attachment element changes into a second relative pose.

In a subsequent step 606, a second actual position, a second actual alignment, and a second actual relative speed for the surroundings sensor 12 are now ascertained in the second relative pose between the vehicle-side attachment element and the surroundings sensor 12, for example by means of the computing unit 18.

In the next step 608, the first actual position and the second actual position are averaged (for example again by means of the computing unit 18) to form an averaged actual position and this averaged actual position is finally assigned to the target position of the surroundings sensor 12.

Analogously, in a step 610, the first actual alignment and the second actual alignment are averaged to form an averaged actual alignment and this averaged actual alignment is finally assigned to the target alignment of the surroundings sensor 12.

Analogously, in a step 612, the first actual relative speed and the second actual relative speed are averaged to form an averaged actual relative speed and this averaged actual relative speed is finally assigned to the target relative speed.

The method finally ends at step 614.

Finally, reference is made to FIG. 7, which shows a variant of the method from FIG. 6.

Like the method in FIG. 6, the method in FIG. 7 has steps 600 to 612. However, in this variant of the method, in an additional step 700, a target position of a further surroundings sensor (for example surroundings sensor 40 of FIG. 5) is determined with the aid of the already determined target position for the surroundings sensor 12. Analogously, in an additional step 702, a target alignment of the further surroundings sensor (for example surroundings sensor 40) is determined using the already determined target alignment of the surroundings sensor 12. Analogously, in an additional step 704, a target relative speed of the further surroundings sensor (for example surroundings sensor 40) is determined using the already determined target relative speed of the surroundings sensor 12.

The method ends at step 706.

With the devices described in connection with FIGS. 1 to 5 and with the methods described in connection with FIGS. 6 and 7, it is possible that a previously set calibration for surroundings sensors of the vehicle can be updated or adjusted without external calibration objects having to be used. Due to the fact that the surroundings sensor and the vehicle-side attachment element serving as the calibration object are additionally movable relative to one another, it is possible to obtain different data sets for different relative poses between the surroundings sensor and the vehicle-side attachment element and thus to reliably and securely determine the target position or the target alignment or the target relative speed for the surroundings sensor of the vehicle.

What is claimed is:

1. A method for determining a target position of a surroundings sensor of a vehicle using a vehicle-side attachment element as a calibration object, wherein the surroundings sensor and the vehicle-side attachment element are movable relative to each other, the method comprising:
   ascertaining a first actual position of the surroundings sensor in a first relative pose between the surroundings sensor and the vehicle-side attachment element;
   moving the surroundings sensor and/or the vehicle-side attachment element from the first relative pose to a second relative pose between the surroundings sensor and the vehicle-side attachment element;
   ascertaining a second actual position of the surroundings sensor in the second relative pose; and
   determining the target position of the surroundings sensor by averaging the first actual position and the second actual position to form an averaged actual position and assigning the averaged actual position as the target position;
   wherein the vehicle-side attachment element is fixedly connected to the side of the vehicle.

2. The method as claimed in claim 1, wherein the method further comprises:
   ascertaining a first actual alignment of the surroundings sensor in the first relative pose;
   ascertaining a second actual alignment of the surroundings sensor in the second relative pose; and
   determining the target alignment of the surroundings sensor by averaging the first actual alignment and the second actual alignment to form an averaged actual alignment and assigning the averaged actual alignment as the target alignment.

3. The method as claimed in claim 1, wherein the surroundings sensor captures a relative speed between the vehicle and an object in an environment of the vehicle, the method further comprising:
   ascertaining a first actual relative speed between the surroundings sensor and the vehicle-side attachment element in the first relative pose;
   ascertaining a second actual relative speed between the surroundings sensor and the vehicle-side attachment element in the second relative pose; and determining the target relative speed by averaging the first actual relative speed and the second actual relative speed to form an averaged actual relative speed and assigning the averaged actual relative speed as the target relative speed.

4. The method as claimed in claim 1, wherein moving the surroundings sensor and/or the vehicle-side attachment element from the first relative pose to the second relative pose comprises moving only the vehicle-side attachment element relative to the surroundings sensor.

5. The method as claimed in claim 4, wherein:
the vehicle-side attachment element comprises a mirror of the vehicle adjustable by way of a motor; and
movement of the vehicle-side attachment element takes place using a motor-driven adjustment of the mirror.

6. The method as claimed in claim 1, wherein moving the surroundings sensor and/or the vehicle-side attachment element from the first relative pose to the second relative pose comprises only moving the surroundings sensor relative to the vehicle-side attachment element.

7. The method as claimed in claim 6, wherein:
the surroundings sensor is attached to a hatch of the vehicle adjustable using a motor; and
movement of the surroundings sensor takes place using a motor-driven adjustment of the hatch.

8. The method as claimed in claim 6, wherein movement of the surroundings sensor is effected by a movement of the surroundings sensor along an additional predetermined calibration path.

9. The method as claimed in claim 1, wherein moving the surroundings sensor and/or the vehicle-side attachment element from the first relative pose to the second relative pose comprises moving both the surroundings sensor and the attachment element.

10. The method as claimed in claim 1, further comprising using a further calibration object located in the surroundings of the vehicle for determining the target position or the target alignment of the surroundings sensor or the target relative speed to be ascertained by the surroundings sensor.

11. The method as claimed in claim 1, wherein:
the surroundings sensor comprises a first surroundings sensor; and
the vehicle comprises a second surroundings sensor; and
the method further comprising determining a target position of the second surroundings sensor using the target position of the first surroundings sensor.

12. The method as claimed in claim 11, further comprising determining a target alignment of the second surroundings sensor using the target alignment of the first surroundings sensor.

13. The method as claimed in claim 12, further comprising determining a target relative speed to be ascertained by the second surroundings sensor using the target relative speed to be ascertained by the first surroundings sensor.

14. The method as claimed in claim 1, wherein the surroundings sensor comprises a radar sensor and the first actual position and/or the one second actual position is/are ascertained by means of a synthetic aperture.

15. A device for determining a target position of a surroundings sensor of a vehicle, the device comprising:
a vehicle-side attachment element serving as a calibration object, wherein the surroundings sensor and the vehicle-side attachment element are movable relative to each other; and
a computing unit programmed to:
ascertain a first actual position of the surroundings sensor in a first relative pose between the surroundings sensor and the vehicle-side attachment element;
move the surroundings sensor and/or the vehicle-side attachment element from the first relative pose to a second relative pose between the surroundings sensor and the vehicle-side attachment element;
ascertain a second actual position of the surroundings sensor in the second relative pose; and
determine the target position of the surroundings sensor by averaging the first actual position and the second actual position to form an averaged actual position and assigning the averaged actual position as the target position;
wherein the vehicle-side attachment element is fixedly connected to the side of the vehicle.

* * * * *